March 23, 1948.  M. BIAZZI  2,438,244
PROCESS FOR THE SEPARATION OF LIQUID EMULSIONS
Filed Aug. 14, 1939
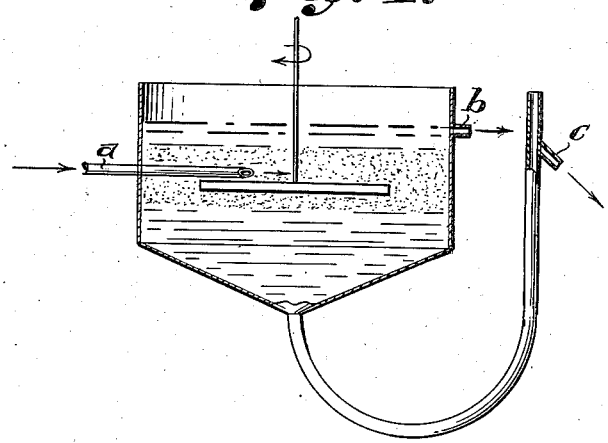
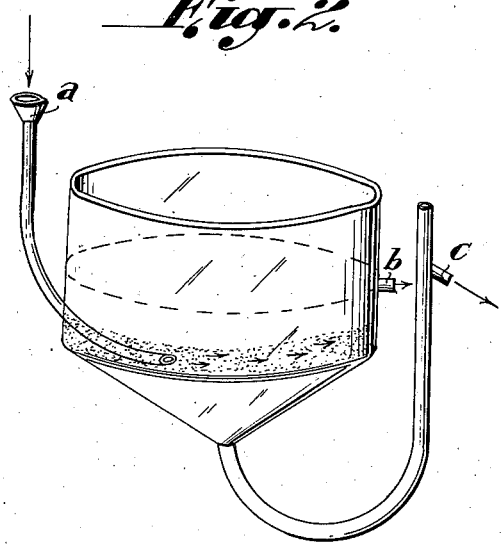
Inventor,
Mario Biazzi
By: Glascock Downing & Seebold
Attorneys.

Patented Mar. 23, 1948

2,438,244

UNITED STATES PATENT OFFICE 2,438,244

PROCESS FOR THE SEPARATION OF LIQUID EMULSIONS

Mario Biazzi, Brig, Switzerland

Application August 14, 1939, Serial No. 290,138
In Germany August 15, 1938

Section 3, Public Law 690, August 8, 1946
Patent expires August 15, 1958

4 Claims. (Cl. 252—349)

It is known that the separation of emulsions may take place in two principal manners:

(1) By leaving the emulsion to rest in a container.

In such a case the drops of the lighter component come to the surface where they unite in a homogeneous layer, whilst the heavier component will stratify at the bottom.

(2) By whirling rapidly the container in which the emulsion is placed so as to centrifugate it.

In both cases the operation may be continuous or intermittent.

In the second case the operation is much swifter than in the first, but it is not always advisable to use machines for the separation, especially when one of the components is an explosive; the present invention is taking into special consideration this case.

On the other hand, in certain cases, the first system has the drawback of being too long, circumstance which must also be avoided in the case of explosives or of materials which cannot easily withstand a long period of separation.

If we examine how the separation by simple rest takes place, we understand that the small drops of the lighter component, meeting and clashing, are forming bigger drops which, endowed with a greater ascensional power and of a relative minor resistance to displace themselves in comparison with the smaller drops, go to meet at the top of the layers of separated product.

The causes which retard the separation are the following:

(a) The surface tension of the drops, (b) The very thin layer of impurities which sometimes envelops the drops, as in the case of nitroglycerine.

The two cases are of a nature which forbids an easy amalgamation of the drops when they are coming lightly in contact with another.

It is evident that the union of the small drops forming bigger drops is essential for the separation, which will be as much swifter as more rapidly the small drops will form into big drops.

It is therefore desirable that their movement, that is to say their meeting, should be helped.

For example, it is known that in the separation of nitroglycerine from the acids left by the nitrification, a temperature of at least 18 to 20 degrees centigrade is necessary, to facilitate the movement of the drops (reduction of the viscosity of the medium). (See Naoum Nitroglycerin Sprengstoffe 1924, page 59, line 8 and following.)

It has also been proposed to add some substance which may develop very small gaseous bubbles, which rising, drag with them the little drops of nitroglycerine, the meeting of which is thus accelerated. (German Patents Nos. 283,330 and 534,534.)

The addition of paraffin and Vaseline oils has instead been suggested to reduce the surface tension of the drops, which in such manner amalgamate together as soon as they meet.

With above considerations in view, I have come to the conclusion that the separation of an emulsion can be rendered easier and swifter by giving to the emulsion a slight whirling movement of an intensity suited to the substances which are to be separated.

Fig. 1 shows an example when the said movement is obtained through an agitator which is working only in the layer of emulsion and not in the separate layers which are below or above.

Fig. 2 shows an alternative example when the emulsion is introduced tangentially in the separator in correspondence with the middle layer of the emulsion so as to obtain practically the movement of this layer only.

It is thus possible to obtain an enormous increase the clashing of the small drops and an increase in the intensity of same, compared with the separation by simple rest, overcoming thus the surface tension and/or the resistance opposed to the superficial layer by the impurities which surround the drops.

To keep the emulsion in a slight movement presents also the advantage, in the case of the separation of nitroglycerine or similar explosives from the acids left by the nitrification, of avoiding dangerous local rises of temperature which are well known causes of the decomposition or of explosion of all the contents of the separator. This is certainly the greatest danger in the preparation of nitroglycerine.

From the pipe $a$ the emulsion to be separated flows, whilst in $b$ and $c$ the separated component are discharged.

The separation container may have any known shape, and may be, if necessary, heated or cooled at the top and/or at the bottom by adapted known means.

A container, having a cylindrical portion and a conical base portion was found particularly advantageous. The emulsion to be separated is introduced into the lower part of the cylindrical portion and the separated components are caused to outflow respectively at the highest and lowest parts of the container.

In operation the emulsion to be separated is fed into the middle portion of the cylindrical container tangentially thereof. When the container has been in operation for a short time there will be a layer at the top and bottom of the container of the two separated liquids respectively with an emulsion layer between the two separated layers. The fresh emulsion which is fed into the container causes the middle emulsion layer to move slowly in a circular path, the speed of movement being so slow that the two separated layers remain substantially stationary.

Having now particularly described and ascertained the nature of my said invention and in what manner the same is to be performed, I declare that what I claim is:

1. In the separation of emulsions of liquids having different specific gravities, the process which comprises introducing an emulsion comprising a nitrated liquid explosive in its nitrification medium into a cylindrical separating zone having a vertical axis, imparting to the emulsion in the central section of said zone a slow rotary motion in a horizontal plane, whereby the emulsion separates into layers above and below said central section, and continuing said rotary motion in said central section without any substantial centrifugal action and without substantial disturbance of the separated liquids above and below said central section while withdrawing said separated liquids from points above and below said central section.

2. The process of claim 1 wherein said slow rotary motion is imparted to the emulsion in said central section by introducing said emulsion into said section tangentially without any substantial centrifugal action.

3. The process of separating nitroglycerine from nitrification media in which it is emulsified, which comprises introducing such an emulsion of nitroglycerine into the central section of a cylindrical separating zone having a vertical axis, imparting a slow rotary motion to the emulsion in said central section in a horizontal plane without any substantial centrifugal action, whereby separated layers are formed above and below the emulsion in said central section, continuing the rotary motion of the emulsion in said central section without substantial disturbance of said separated layers and withdrawing said separated layers from points above and below said central section.

4. In the separation of emulsions of liquids having different specific gravities, the process which comprises introducing an emulsion comprising a nitrated liquid explosive in an aqueous medium into a cylindrical separating zone having a vertical axis, imparting to the emulsion in the central section of said zone a slow rotary motion in a horizontal plane, whereby the emulsion separates into layers above and below said central section, and continuing said rotary motion in said central section without any substantial centrifugal action and without substantial disturbance of the separated liquids above and below said central section while withdrawing said spearated liquids from points above and below said central section.

MARIO BIAZZI.

REFERENCES CITED

The following references are of record in the file of this patent:

UNITED STATES PATENTS

| Number | Name | Date |
|---|---|---|
| 474,685 | Pennell | May 10, 1892 |
| 479,130 | Allert | July 19, 1892 |
| 714,822 | Randall | Dec. 2, 1902 |
| 883,608 | Antoine | Mar. 31, 1908 |
| 1,301,544 | Crombie | Apr. 22, 1919 |
| 1,908,102 | Arledter | May 9, 1933 |
| 2,098,608 | Berges | Nov. 9, 1937 |
| 2,179,919 | Carr et al. | Nov. 14, 1939 |

FOREIGN PATENTS

| Number | Country | Date |
|---|---|---|
| 431,552 | France | Nov. 14, 1911 |
| 642,586 | France | Aug. 31, 1928 |